United States Patent
Yu et al.

(10) Patent No.: US 12,011,773 B2
(45) Date of Patent: Jun. 18, 2024

(54) CUTTING ELEMENTS WITH REDUCED VARIABLE BACK RAKE ANGLE

(71) Applicants: CNPC USA CORPORATION, Houston, TX (US); BEIJING HUAMEI INC., Beijing (CN)

(72) Inventors: Jiaqing Yu, Houston, TX (US); Chris Cheng, Houston, TX (US); Ning Li, Houston, TX (US); David He, Houston, TX (US); Kevin Waddell, Houston, TX (US); Xu Wang, Beijing (CN); Chi Ma, Beijing (CN); Xiongwen Yang, Beijing (CN)

(73) Assignees: CNPC USA Corporation, Houston, TX (US); Beijing Huamei, Inc., Beijing (CN)

( * ) Notice: Subject to any disclaimer, the term of this patent is extended or adjusted under 35 U.S.C. 154(b) by 393 days.

(21) Appl. No.: 17/331,358

(22) Filed: May 26, 2021

(65) Prior Publication Data
US 2021/0370419 A1    Dec. 2, 2021

Related U.S. Application Data

(60) Provisional application No. 63/030,477, filed on May 27, 2020.

(51) Int. Cl.
*E21B 10/567* (2006.01)
*B23C 5/22* (2006.01)

(52) U.S. Cl.
CPC ........ *B23C 5/2213* (2013.01); *E21B 10/5673* (2013.01); *B23C 2200/123* (2013.01); *B23C 2200/203* (2013.01)

(58) Field of Classification Search
CPC .............. E21B 10/567; E21B 10/5673
See application file for complete search history.

(56) References Cited

U.S. PATENT DOCUMENTS

| | | | |
|---|---|---|---|
| 2010/0243334 A1 | 9/2010 | Dourfaye et al. | |
| 2016/0230472 A1 | 8/2016 | Bilen et al. | |
| 2017/0100819 A1* | 4/2017 | Cheng | E21B 10/567 |
| 2017/0234078 A1 | 8/2017 | Patel et al. | |
| 2018/0100819 A1 | 4/2018 | Melamed | |
| 2019/0071933 A1* | 3/2019 | Gan | E21B 10/55 |

FOREIGN PATENT DOCUMENTS

WO    2015161010 A2    10/2015

OTHER PUBLICATIONS

International Search Report and Written Opinion dated Sep. 17, 2021 for related PCT/US2021/070611.

* cited by examiner

*Primary Examiner* — Giovanna Wright
(74) *Attorney, Agent, or Firm* — Ramey LLP; Jacob B. Henry

(57) ABSTRACT

A drill bit for cutting formation comprises a bit body, a plurality of cutters, and a plurality of blades with pockets to accommodate the cutters, respectively. In an embodiment, the plurality of cutters comprise a substrate, an ultra-hard layer, a concave surface on the top of the ultra-hard layer, wherein the concave surface comprises a plurality of planar and curved surfaces.

9 Claims, 13 Drawing Sheets

Prior art

Prior art

Prior art

CUTTING ELEMENTS WITH REDUCED VARIABLE BACK RAKE ANGLE

CROSS-REFERENCE TO RELATED APPLICATIONS

This application claims the benefit of U.S. Provisional Patent Application No. 63/030,477, filed May 27, 2020; which is incorporated by reference herein in its entirety.

FIELD

The disclosure generally relates to drill bits in the oil and gas industry. The disclosure specifically relates to cutting elements in the field of drill bits for the petroleum exploration and drilling operation.

BACKGROUND

When drilling a borehole in the earth, such as for the recovery of hydrocarbons or for other applications, it is conventional practice to connect a drill bit on the lower end of a drill string. The bit is rotated by rotating the drill string at the surface or by actuation of downhole motors or turbines, or by both methods. The drill bit is rotated and advanced into the subterranean formation. As the drill bit rotates, the cutters or abrasive structures cut, crush, shear, and/or abrade away the formation material to form the borehole. Different types of rotary drill bits are known in the practice including, for example, fixed cutter bits (which are often referred to in the practice as "drag" bits), rolling cutter bits (which are often referred to in the practice as "rock" bits), diamond-impregnated bits, and hybrid bits (which may include, for example, fixed cutters and rolling cutters).

Referring to FIG. 1, a conventional bit adapted for drilling through formations of rock to form a borehole is shown. The bit includes a drill bit body 3 and a plurality of blades 4 and a connection or pin 32 for connecting the bit to a drill string (not shown) which is employed to rotate the bit around the longitudinal bit axis 6 to drill the borehole. The blades 4 are separated by channels or gaps that enable drilling fluid to flow through and clean and cool the blades 4 and the cutters 5. The cutters 5 are held in the blades 4 at predetermined angular orientations and radial locations to present the top surface 503 with a desired back rake angle against a formation to be drilled. A fluid channel 31 is formed in the drill bit body 3, and a plurality of fluid holes 33 communicate with the fluid channel. Drilling fluid can be pumped to selected directions and at selected rates of flow between the cutting blades 4 for lubricating and cooling the drill bit, the blades 4 and the cutters 5. The drilling fluid also cleans and removes the cuttings as the drill bit rotates and penetrates the formation.

The drill bit body 3 is cylindrical. The plurality of cutters 5 are disposed on the outer edge of the blade 4, furthermore, the outer edge of the blade 4 comprises a cone portion 431, a nose portion 432, a shoulder portion 433 and a gauge protection portion 434. The cone portion 431 is close to the central axis of the drill bit body 3, the gauge protection portion 434 is located on the side wall of the drill bit body 3 and the cutters 5 are distributed across the cone portion 431, the nose portion 432, the shoulder portion 433 and the gauge protection portion 434 of the blades 4.

Referring to FIGS. 2A-2C, a cutter 5 is substantially cylindrical, including a cylindrical bottom portion and a cylindrical top portion. The bottom portion, called the substrate 504, is usually made from hard composites such as tungsten carbide, and the top portion, called the ultra-hard layer 502, is typically made from hard and abrasive material such as polycrystalline diamond (PCD). The substrate 504 and the ultra-hard layer 502 are sintered together through high pressure high temperature process. On the top end of the ultra-hard layer 502, a chamfer 507 is machined to increase the durability of the cutting edge while running into the borehole and at the inception of drilling, at least along the portion which initially contacts the formation. One skilled in the art will recognize that at least a portion of the chamfer 507 may also function as a working surface that contacts a subterranean formation during drilling operations. The top surface 503 of the ultra-hard layer 502 and the chamfer surface 507 intersect at the top cutting edge 513, and the side wall 512 of the ultra-hard layer 502 and the chamfer surface 507 intersect at the lower cutting edge 514 which is the main formation cutting edge.

Referring to FIGS. 3A and 3B, a cutter 5 cuts the formation 410 with top surface 503. In the drilling process, the drill bit (see FIG. 1) will be rotated for cutting the inside and the bottom surfaces of a cylindrical well bore. The cutters in the blades are assembled via brazing or mechanical lock at predetermined angular orientations in regard to the formation to be drilled. The ultra-hard layer 502 cuts rock and withstands great impact from the rock at the same time. The angle between the cutter axis and the top surface of the formation 410 is called relief angle 620. A certain relief angle is necessary to prevent cutter from rubbing against the formation, avoiding frictional heat and extra reactive torque during drilling.

A back rake angle 610 is used to describe the working angle of the top surface 503, which is defined as the angle between the top surface 503 and a plane normal to the surface of formation 410 at the cutting edge 514. For a cylindrical flat cutter, the back rake angle 610 is equal to the relief angle 620. In FIGS. 3A and 3B, the back rake angle 610 is greater than the back rake angle 612.

Recommended back rake angle can vary depending on the formation being drilled. For a hard formation, such as carbonate, igneous rocks and sandstone, a relatively large back rake angle is used in order to increase the strength of the cutting edge and prevent cutters from breakage or chipping due to the high cutting force acting on the cutters. However, the cutting efficiency is sacrificed and sometimes it is difficult for the cutter to bite into the formation, resulting in unstable drilling. For soft formation, such as shale, claystone and mudstone, lower cutting force is used to shear the formation and the cutter damage is not significant. A relatively small back rake angle can be used to increase cutter aggressiveness and maximize the rate of penetration (ROP) without causing cutter damage. However, for the conventional PCD cutter with flat cutting face, the smallest allowed back rake angle, which is equal to the relief angle, to be used is limited. If it is too small, the cutter's lower circumferential surface will rub against the formation, increasing the frictional heat and adding extra reactive torque. The increased frictional heat will degrade the cutter wear resistance and impact resistance. Another disadvantage of the cutters with flat cutting face in drilling soft formation, especially the shale and claystone under high confining pressure and high bottom-hole temperature, is the continuous ribbon (i.e., a long strip shape debris) the cutter creates. Continuous ribbons are not desirable for the drilling because they remain in contact with the cutting face for a longer period, resulting in more frictional heat. Continuous ribbon may extend to the bottom of the blade, plug the nozzles, and make it difficult to clean the bottom hole, evacuate the cuttings, and cool down the cutters. The ribbon shaped cuttings may also accumulate and compact in front of the cutter face and/or between the cutter and the rock. Cutting build-up has a major impact on cutter/rock interactions because energy is lost in plastic deformation of the cuttings rather than failing the intact rock. Cutting build-up may also lead to other drilling dysfunctions such as poor cooling and even cutter balling. Due to the large size of these kinds of cuttings, they could attach to the blades and the body part of the bit to form balling, such that the work faces of the blades of the bit are clogged, restricting drilling fluid and cutting flow, eventually leading to decrease of mechanical speed, no drill footage, and other issues.

Therefore, it would be advantageous to have a cutter with reduced back rake angle and chip breaker feature to improve cutting efficiency when drilling soft formation.

SUMMARY

In one aspect, the present disclosure is directed to a cutter used on a drill bit for cutting formation. The cutter comprises a substrate, an ultra-hard layer, a concave surface on the top of the ultra-hard layer, and the concave surface comprising a plurality of planar and curved surfaces. The cutter further comprises a chamfer extending from the periphery of the concave surface to a cutting edge at a side wall of the ultra-hard layer.

In some embodiments, the concave surface comprises a first flat surface, a second flat surface, a curved surface and a third flat surface arranged in an order from a cutting point to an opposite edge of the cutting point on the periphery of the concave surface. The first flat surface has a tilted angle $\alpha$, the second flat surface has a tilted angle $\beta$, and angle $\beta$ is larger than angle $\alpha$. The third flat surface is parallel to the bottom surface of the cutter or has a tilted angle $\gamma$.

In some embodiments, the concave surface comprises a cutting ridge extending from a cutting point to an opposite edge of the cutting point on the periphery of the concave surface. The concave surface comprises a first slanted surface, a curved surface, and a second slanted surface arranged along the cutting ridge. The first slanted surface, the curved surface, and the second slanted surface are slanted downward from the cutting ridge to the periphery of the curved surface along perpendicular directions with respect to the cutting ridge.

In some embodiments, the concave surface comprises a first flat surface, a first curved surface, a second curved surface and a second flat surface arranged in an order from a cutting point to an opposite edge of the cutting point on the periphery of the concave surface.

In some embodiments, the concave surface comprises a first flat surface, a spline surface, and a second flat surface arranged in an order from a cutting point to an opposite edge of the cutting point on the periphery of the concave surface.

In some embodiments, the concave surface comprises a spline surface, a curved surface and a flat surface arranged in an order from a cutting point to an opposite edge of the cutting point on the periphery of the concave surface.

In some embodiments, the concave surface comprises a slant surface, a curved surface, a spline surface in an order from a cutting point to an opposite edge of the cutting point on the periphery of the concave surface. The slant surface, the curved surface and the spline surface are slanted downward from a cutting ridge to the periphery of the curved surface along perpendicular directions with respect to the cutting ridge.

In some embodiments, the ultra-hard layer includes two cutting points on opposite sides on the periphery of the concave surface, and the concave surface comprises a first flat surface and a second flat surface on two sides of the cutting points, a third flat surface at the center of the concave surface, and a curved surface between two flat surfaces and the center flat surface.

In some embodiments, the concave surface comprises a cutting ridge extending from a cutting point to an opposite edge of the cutting point on the periphery of the concave surface. The concave surface comprises a first undulating surface, a second undulating surface, and a third undulating surface arranged along the cutting ridge. The undulating surfaces are propagating downward from the cutting ridge to the periphery of the curved surface along perpendicular directions with respect to the cutting ridge.

In some embodiments, the ultra-hard layer is formed of PCD and the concave surface is machined by Electrical Discharge Machining method.

In another aspect, the present disclosure is directed to a drill bit for cutting formation. The drill bit includes a bit body, a plurality of cutters of the present disclosure, and a plurality of blades with pockets to accommodate the cutters respectively.

The foregoing has outlined rather broadly the features of the present disclosure in order that the detailed description that follows may be better understood. Additional features and advantages of the disclosure will be described hereinafter, which form the subject of the claims.

BRIEF DESCRIPTION OF THE DRAWINGS

In order that the manner in which the above-recited and other enhancements and objects of the disclosure are obtained, a more particular description of the disclosure briefly described above will be rendered by reference to specific embodiments thereof which are illustrated in the appended drawings. Understanding that these drawings depict only typical embodiments of the disclosure and are therefore not to be considered limiting of its scope, the disclosure will be described with additional specificity and detail through the use of the accompanying drawings in which.

DETAILED DESCRIPTION

Figure 1:
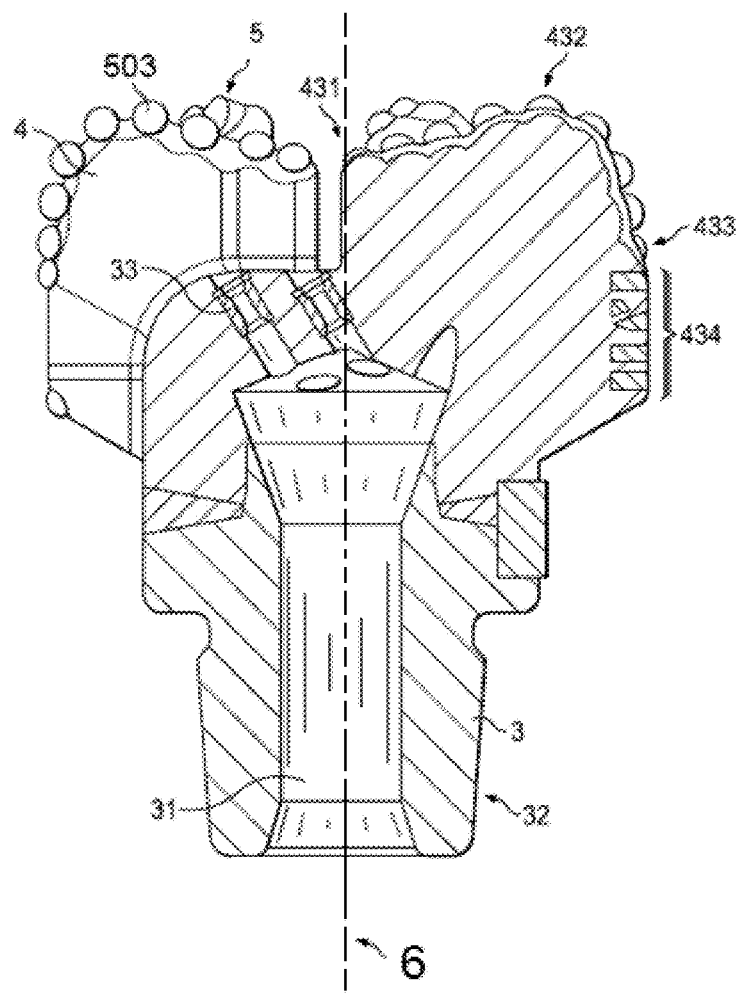
FIG. 1 is a sectional view of a prior art drill bit.
Figure 2A:
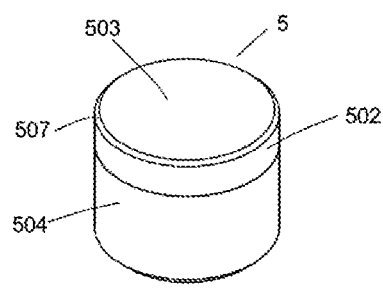
FIG. 2A is a perspective view of a prior art cutter with planar working surface.
Figure 2B:
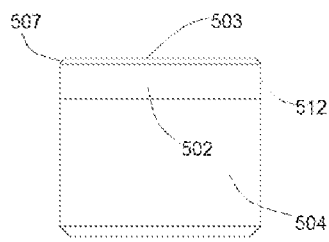
FIG. 2B is a front view of the cutter in FIG. 2A.
Figure 2C:
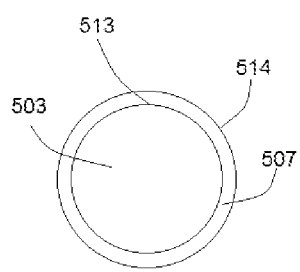
FIG. 2C is a top view of the cutter in FIG. 2A.
Figure 3A:
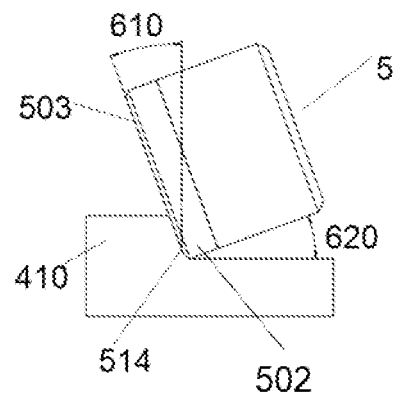
FIG. 3A is a schematic illustration of planar cutter cutting formation with large back rake angle.
Figure 3B:
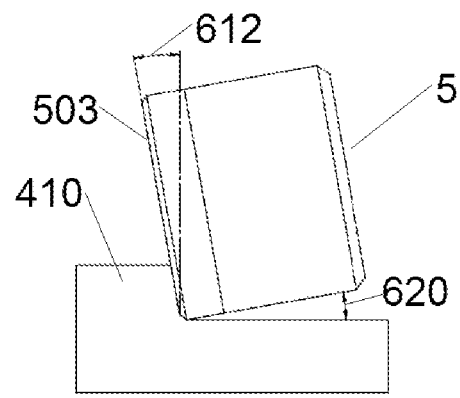
FIG. 3B is a schematic illustration of planar cutter cutting formation with small back rake angle.

The particulars shown herein are by way of example and for purposes of illustrative discussion of the preferred embodiments of the present disclosure only and are presented in the cause of providing what is believed to be the most useful and readily understood description of the principles and conceptual aspects of various embodiments of the disclosure. In this regard, no attempt is made to show the structural details of the disclosure in more detail than is necessary for the fundamental understanding of the disclosure, and the description taken with the drawings making it apparent to those skilled in the art how the several forms of the disclosure may be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary 11th Edition.

FIGS. 4A-4D illustrate an embodiment of a cutting element 51 of the present disclosure. In accordance with the present disclosure, the concave cutter 51 has a substrate 504 and an ultra-hard layer 502 disposed thereon. The ultra-hard layer 502 can be formed of polycrystalline diamond, cubic boron nitride, silicon carbide, or other ultra-hard materials, and the substrate 504 can be formed of tungsten carbide. The interface between the substrate 504 and the ultra-hard layer 502 may be planar or nonplanar, according to many varying designs for interfaces known in the art. The concave cutter 51 is substantially cylindrical and symmetrical to a longitudinal axis, although such symmetry is not required, and nonsymmetrical cutters are known in the art. The top surface 503 of the ultra-hard layer 502 is concave. A chamfer 507 extends from the periphery of the top surface 503 to the cutting edge 514 at the side wall 512 of the ultra-hard layer 502. The chamfer 507 and the cutting edge 514 may extend to the periphery of the ultra-hard layer 502 as shown or along the periphery portion to be located adjacent the cutting point 521. Although a chamfer 507 can increase the durability of the cutting edge, cutters exhibiting substantially no visible chamber may be employed for certain applications in certain selected outer regions of a bit.

Figure 4A:
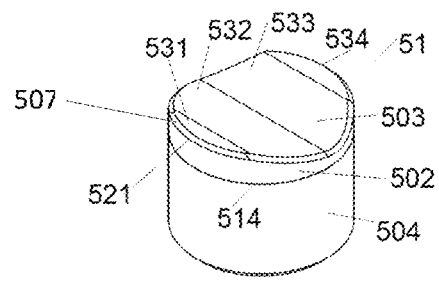
FIG. 4A is a perspective view of the cutter with concave cutting face, which comprises three flat surfaces and one curved surface in accordance with one embodiment of the present disclosure.
Figure 4B:
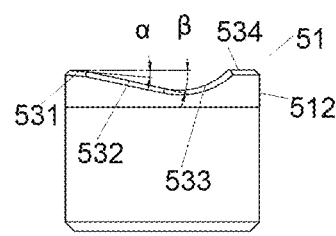
FIG. 4B is a front view of the cutter with concave cutting face in FIG. 4A.
Figure 4C:
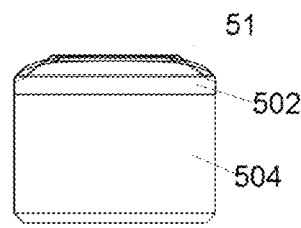
FIG. 4C is a side view of the cutter with concave cutting face in FIG. 4A.
Figure 4D:
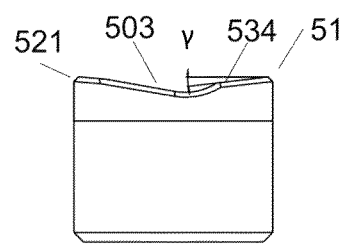
FIG. 4D is a side view of the cutter with concave cutting face in FIG. 4A with the three flat surfaces tilted.

Generally, the top surface 503 of the ultra-hard layer 502 is concave. Particularly, the concave top surface 503 comprises a plurality of planar and curved surfaces. FIG. 4A shows a perspective view of a concave cutter 51, where the top surface 503 includes a first flat surface 531, a second flat surface 532, a curved surface 533 and a third flat surface 534 arranged radially in order from the cutting point 521 to the opposite edge of the cutting point 521 around the periphery of the top surface 503. FIG. 4B shows a front view of the concave cutter 51 in FIG. 4A. The first flat surface 531 can be parallel to the cutter bottom surface or slanted downwards in a direction from the cutting point 521 along the periphery of the top surface 503 to the center of the top surface 503. The second flat surface 532 is adjacent to the first flat surface 531 and slopes down at the same direction as the slanted first flat surface 531. A tilted angle is measured between the flat surface and a plane parallel to the cutter bottom surface. In FIG. 4B, the first flat surface 531 has a tilted angle $\alpha$, the second flat surface 532 has a tilted angle $\beta$, and angle $\beta$ is larger than angle $\alpha$. In some embodiments, the range of angle $\alpha$ can be 0-30 degrees, the range of angle $\beta$ can be 5-60 degrees. In an embodiment, the angle $\alpha$ is 5 degrees and the angle $\beta$ is 12.5 degrees. The curved surface 533 is adjacent to the second flat surface 532 on one side, and adjacent to the third flat surface 534 on the other side. In FIG. 4B, the third flat surface 534 is on the opposite side of the first flat surface 531 around the periphery of the top surface 503 and is parallel to the bottom surface of the cutter, that is, the tilted angle of the third flat surface 534 is zero. FIG. 4C is a side view of the cutter with concave cutting face in FIG. 4A. In another embodiment, as shown in FIG. 4D, the third flat surface 534 is slanted downwards in a direction from the opposite edge of the cutting point 521 along the periphery of the top surface 503 to the center of the top surface 503 and has a tilted angle γ. In another embodiment, the third flat surface 534 is slanted downwards in the same direction as the first flat surface 531 (not shown).

Figure 5A:
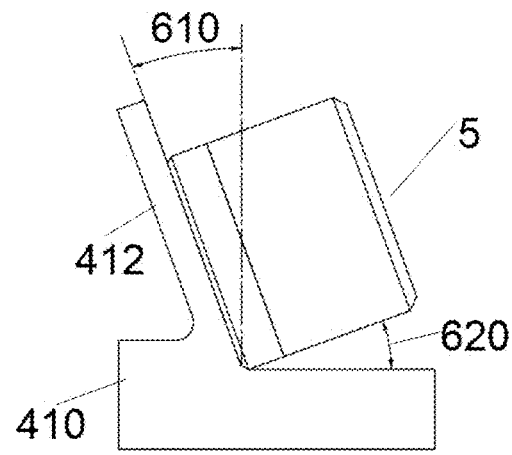
FIG. 5A is a schematic illustration of the ribbon shaped cutting created by the planar cutter.
Figure 5B:
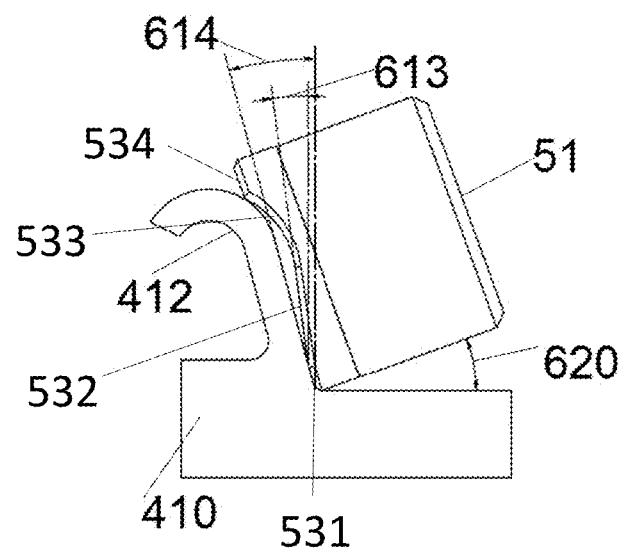
FIG. 5B is a schematic illustration of the cutting created by the cutter with concave cutting face in FIG. 4A.

FIG. 5A shows the ribbon shaped cutting created by a planar cutter 5. FIG. 5B shows the cutting created by the cutter 51 with a concave cutting face in FIG. 4A. When cutting into the formation 410, the planar cutter 5 and the concave cutter 51 have the same relief angle 620 in FIGS. 5A and 5B. Because of the first flat surface 531, the back rake angle 614 of the concave cutter 51 is smaller than the back rake angle 610 of the planar cutter 5. The back rake angle 614 is the back rake angle 610 minus the tilted angle α, such that the concave cutter 51 has a sharper cutting edge than the planar cutter 5 and allows a higher rate of penetration. For the high depth of cut, where the second flat surface 532 interacts with the cuttings, its smaller back rake angle 613 (the back rake angle 610 minus the tilted angle β) allows a higher rate of penetration. Referring to FIG. 5A, the planar cutter 5 has no ability to prevent the continuous cutting ribbon 412 from adhering or sticking to the cutting face, resulting in more frictional heat. Referring to FIG. 5B, the forward curling feature on the curved surface 533, adjacent to the third flat surface 534, can fold and break the continuous cutting ribbon 412 to make it easy to evacuate the cuttings and allow the drilling fluid to cool the cutting face more effectively.

Figure 6A:
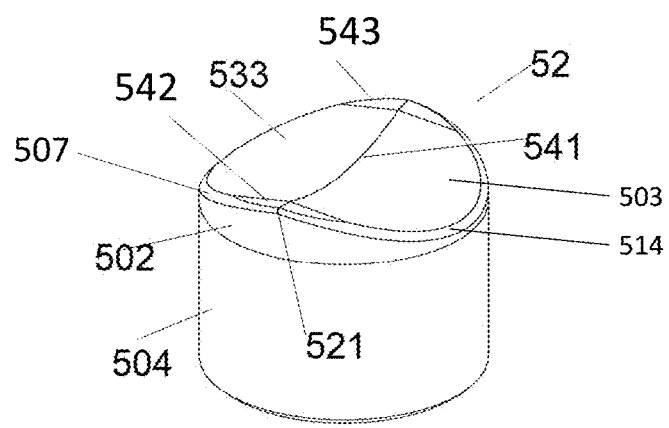
FIG. 6A is a perspective view of the cutter with concave cutting face, which features a ridge in the middle in accordance with one embodiment of the present disclosure.
Figure 6B:
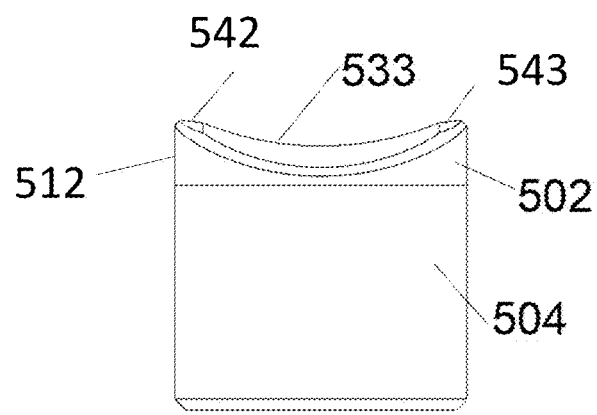
FIG. 6B is a front view of the cutter with concave cutting face in FIG. 6A.

In an embodiment of the present disclosure, the concave cutting surface may have a ridge in the middle. FIGS. 6A and 6B illustrate a cutter having a concave surface. Specifically, the cutter 52 has a substrate 504 and an ultra-hard layer 502 disposed thereon. A chamfer 507 extends from the periphery of the top surface 503 to the cutting edge 514 at the side wall 512 of the ultra-hard layer 502. The top surface 503 of the ultra-hard layer 502 is concave. A cutting ridge 541 extends on the top surface 503 from the cutting point 521 to the opposite edge of the cutting point 521 on the periphery of the top surface 503. A first slanted surface 542, a curved surface 533, and a second slanted surface 543 on the top surface 503 are arranged in the order along the cutting ridge 541. The first slanted surface 542 and the second slanted surface 543 are flat surfaces and are parallel to the cutter bottom or slanted downwards along the cutting ridge 541 from the cutting point 521 towards the center of the top surface 503. The curved surface 533 curves downwards along the cutting ridge 541 starting from the end of first slanted surface 542 to the second slanted surface 543. The first slanted surface 542, the curved surface 533, and the second slanted surface 543 are slanted downward from the cutting ridge 541 to the periphery of the concave top surface 503 along the perpendicular directions with respect to the cutting ridge.

Figure 7A:
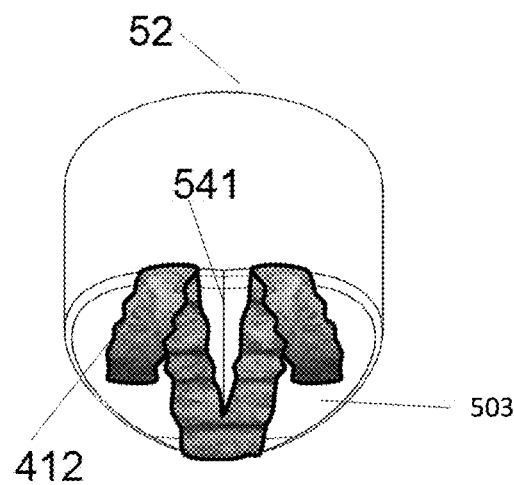
FIG. 7A is a schematic illustration of split ribbon cutting created by the cutter with ridged concave cutting face in FIG. 6A.
Figure 7B:
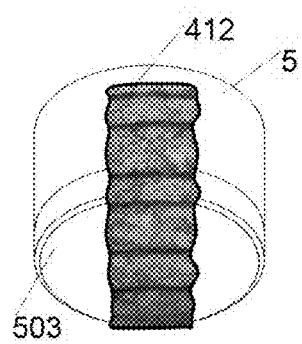
FIG. 7B is a schematic illustration of cutting created by a planar cutter.

FIG. 7A shows the cutting created by the cutter 52 with a ridged concave cutting face in FIG. 6A. FIG. 7B shows the ribbon shaped cutting created by a planar cutter 5. When cutting into the formation to produce cuttings, referring to FIG. 7B, the planar cutter 5 has no ability to prevent continuous cutting ribbon 412 from adhering or sticking to the cutting face, resulting in more frictional heat. Referring to FIG. 7A, the concave top surface 503 and the cutting ridge 541 can split, fold and break the continuous cutting ribbon 412 into smaller pieces to make it easy to evacuate the cuttings and allow the drilling fluid to cool the cutting face more effectively.

Figure 8A:
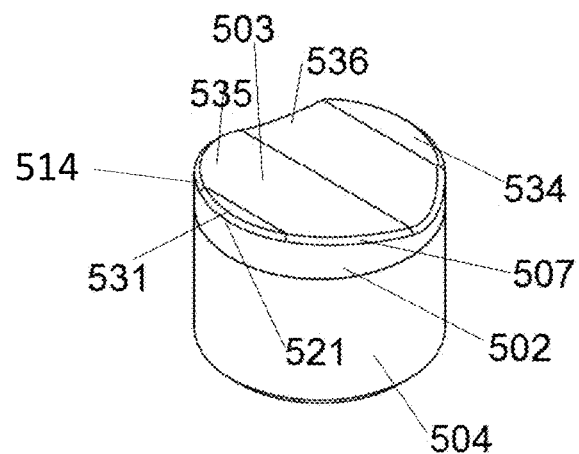
FIG. 8A is a perspective view of the cutter with concave cutting face, which comprises two flat surfaces and two curved surfaces in accordance with one embodiment of the present disclosure.
Figure 8B:
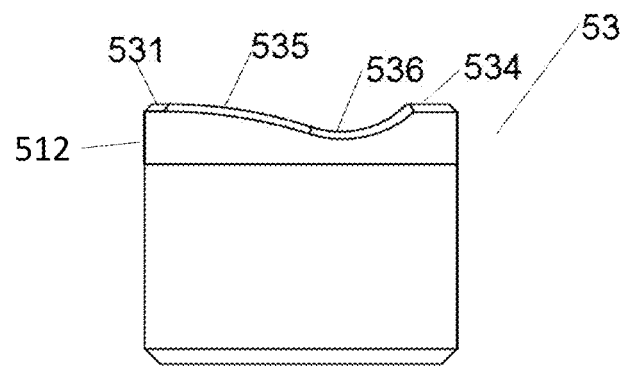
FIG. 8B is a front view of the cutter with concave cutting face in FIG. 8A.

The concave cutting face of the cutter can be in many other forms. In an embodiment, referring to FIG. 8A-8B, a cutter 53 having a concave surface is illustrated. The cutter 53 has a substrate 504 and an ultra-hard layer 502 disposed thereon. A chamfer 507 extends from the periphery of the top surface 503 to the cutting edge 514 at the side wall 512 of the ultra-hard layer 502. The top surface 503 of the ultra-hard layer 502 is concave. The top surface 503 comprises a first flat surface 531, a first curved surface 535, a second curved surface 536 and a second flat surface 534 arranged in order from the cutting point 521 to the opposite edge of the cutting point 521 around the periphery of the top surface 503. The first flat surface 531 is parallel to the cutter bottom surface or slanted downwards with a tilted angle. The first curved surface 535 is adjacent to the first flat surface 531 on one side and adjacent to the second curved surface 536 on the other side. The second curved surface 536 is adjacent to the first curved surface 535 on one side, and adjacent to the second flat surface 534 on the other side. The second flat surface 534 is parallel to the bottom surface of the cutter or has a tilted angle γ (not shown).

Figure 9A:
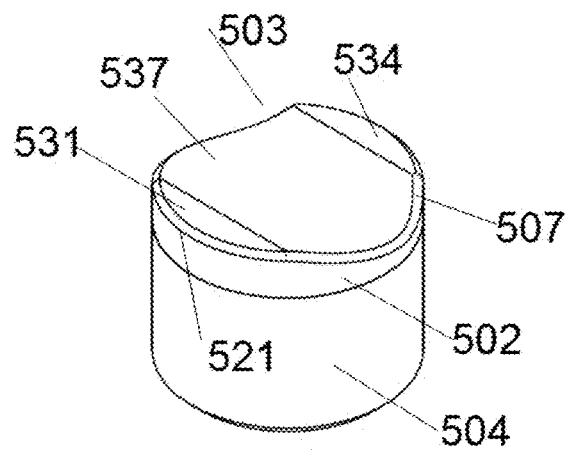
FIG. 9A is a perspective view of the cutter with concave cutting face, which comprises two flat surfaces and one spline surface in accordance with one embodiment of the present disclosure.
Figure 9B:
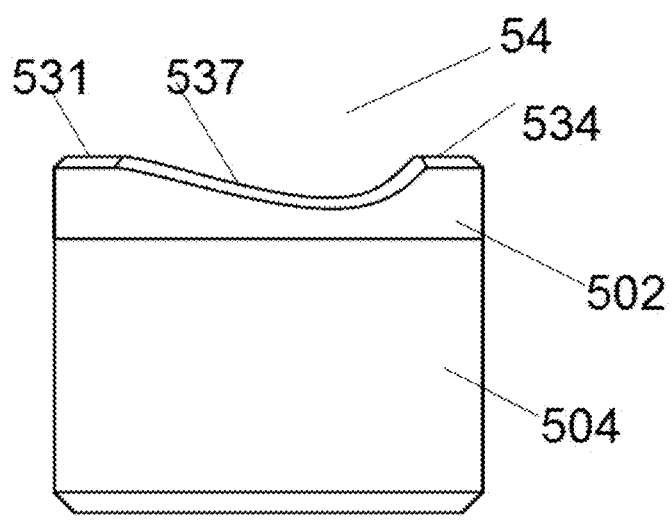
FIG. 9B is a front view of the cutter with concave cutting face in FIG. 9A.

FIGS. 9A-9B illustrate an alternative embodiment of a cutting element 54 of the present disclosure. The cutter 54 has a substrate 504 and an ultra-hard layer 502 disposed thereon. The top surface 503 of the ultra-hard layer 502 is concave. Particularly, the concave top surface 503 comprises a first flat surface 531, a spline surface 537, a second flat surface 534 arranged in order from the cutting point 521 to the opposite edge of the cutting point 521 around the periphery of the top surface 503. The first flat surface 531 is parallel to the cutter bottom surface or slanted downwards with a tilted angle. The second flat surface 534 is parallel to the bottom surface of the cutter or has a tilted angle γ (not shown). The spline surface 537 is adjacent to the first flat surface 531 on one side and adjacent to the second flat surface 534 on the other side. The spline surface 537 is a smooth surface the shape of which closely follows a sequence of control points. The spline surface 537 is constructed by extending a Bezier curve at a plane that passes through the cutting point 521 and the cutter axis to both sides of the plane. The spline surface 537 can make the concave surface smoother and the curvature change on the top surface 503 more even, which will reduce the friction between the top surface 503 and the cuttings contacting with the top surface 503, resulting in less frictional heat. Another advantage of using the spline surface is to reduce the stress concentration caused by the irregularities of the geometry during the interactions between the concave surface and the formation.

As will be recognized by those skilled in the art, there are other cutter designs in accordance with the features of this disclosure. FIG. 10A through FIG. 13D represent some of the design alternatives which may be used.

Figure 10A:
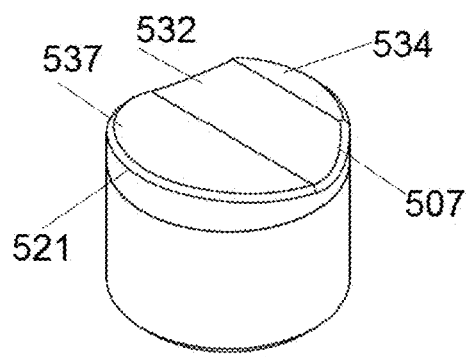
FIG. 10A is a perspective view of the cutter with concave cutting face, which comprises one spline surface, one curved surface and one flat surface in accordance with one embodiment of the present disclosure.
Figure 10B:
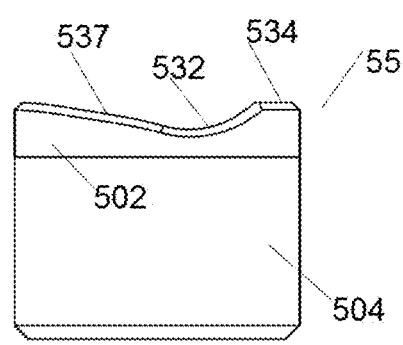
FIG. 10B is a front view of the cutter with concave cutting face in FIG. 10A.

Referring to FIGS. 10A and 10B, the cutter 55 has a substrate 504 and an ultra-hard layer 502 disposed thereon. The top surface 503 of the ultra-hard layer 502 is concave. Specifically, the concave top surface 503 comprises a spline surface 537, a curved surface 532 and a flat surface 534 arranged in order from the cutting point 521 to the opposite edge of the cutting point 521 around the periphery of the top surface 503. The spline surface 537 is slanted downwards. The curved surface 532 is adjacent to the spline surface 537 on one side and adjacent to the flat surface 534 on the other side. The flat surface 534 is parallel to the bottom surface of the cutter or has a tilted angle γ (not shown).

Figure 11A:
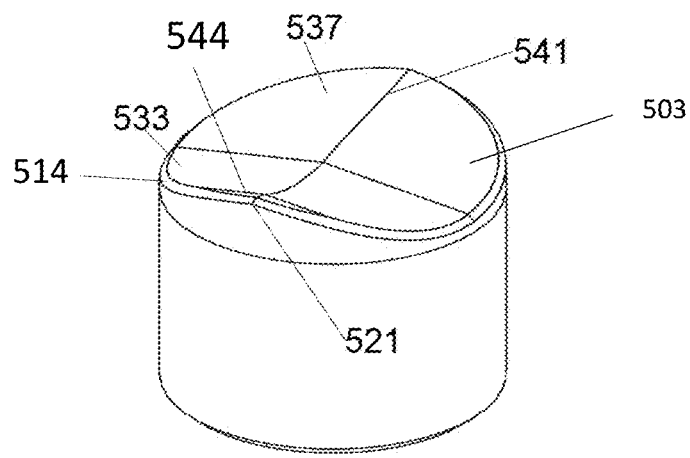
FIG. 11A is a perspective view of the cutter with a concave cutting face, which features a ridge in the middle in accordance with one embodiment of the present disclosure, and concave cutting face asymmetrical with respect to a plane perpendicular to the ridge.
Figure 11B:
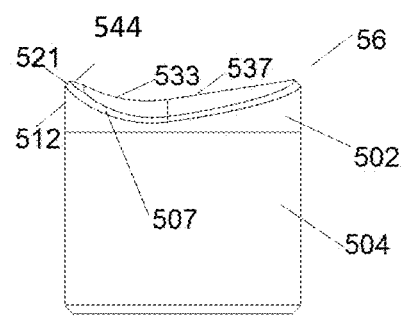
FIG. 11B is a front view of the cutter with concave cutting face in FIG. 11A.

Referring to FIGS. 11A and 11B, the cutter 56 has a substrate 504 and an ultra-hard layer 502 disposed thereon. A chamfer 507 extends from the periphery of the top surface 503 to the cutting edge 514 at the side wall 512 of the ultra-hard layer 502. The top surface 503 of the ultra-hard layer 502 is concave. A cutting ridge 541 extends on the top surface 503 from the cutting point 521 to the opposite edge of the cutting point 521 around the periphery of the top surface 503. A slanted surface 544, a curved surface 533, and a spline surface 537 on the top surface 503 are arranged in order along the cutting ridge 541. The slanted surface 544 is a flat surface and parallel to the cutter bottom surface or slanted downwards along the cutting ridge 541 from the cutting point 521 to the center of the top surface 503. The curved surface 533 is adjacent to the slanted surface 544 on one side and adjacent to the spline surface 537 on the other side. The slanted surface 544, the curved surface 533, and the spline surface 537 are slanted downward from the cutting ridge 541 to the periphery of the top surface 503 along the perpendicular direction with respect to the cutting ridge. The ridge feature can apply to any of the embodiments. The ridge generally follows the contour of the concave cutting face and the surface on either side of the ridge slanting down towards the cylindrical cutter surface in the directions perpendicular to the ridge itself.

Figure 12A:
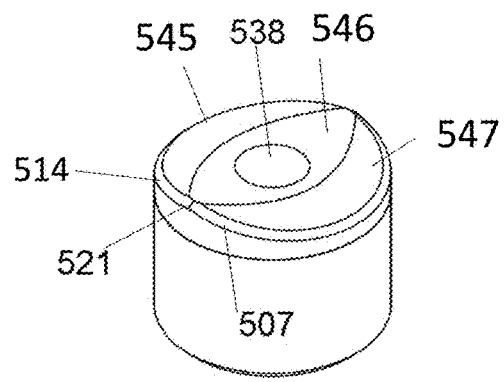
FIG. 12A is a perspective view of the cutter with concave cutting face, which comprises three flat surfaces and one curved surface in accordance with one embodiment of the present disclosure.
Figure 12B:
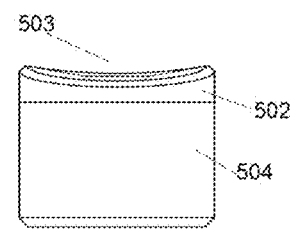
FIG. 12B is a front view of the cutter with concave cutting face in FIG. 12A.
Figure 12C:
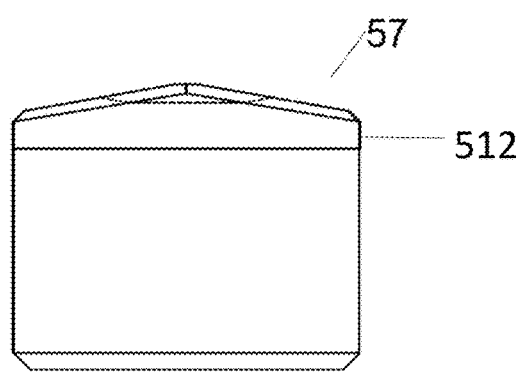
FIG. 12C is a side view of the cutter with concave cutting face in FIG. 12A.
Figure 12D:
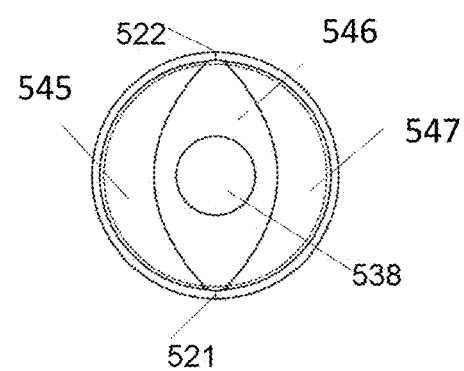
FIG. 12D is a top view of the cutter with concave cutting face in FIG. 12A.

Referring to FIGS. 12A and 12D, the cutter 57 has a substrate 504 and an ultra-hard layer 502 disposed thereon. A chamfer 507 extends from the periphery of the top surface 503 to the cutting edge 514 on the side wall 512 of the ultra-hard layer 502. The top surface 503 of the ultra-hard layer 502 is concave. Specifically, the ultra-hard layer 502 includes two cutting points 521, 522 on opposite sides on the periphery of the top surface 503. The concave cutting face comprises the first and the second flat surfaces 545, 547 adjacent to the cutting points, a center flat surface 538 at the center of the cutting face, and a curved surface 546 between the first and the second flat surfaces 545, 547 and the center flat surface 538. The first and the second flat surfaces 545, 547 are slanted downwards with a tilted angle. The cutter 57 has two cutting points. It allows the cutter to be re-used by rotating it by 180 degrees once one cutting point is worn and loses cutting sharpness.

Figure 13A:
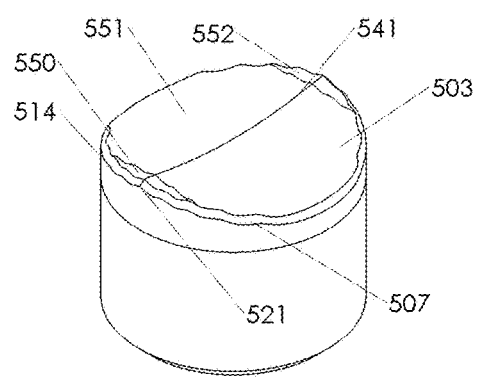
FIG. 13A is a perspective view of the cutter with concave cutting face, which comprises three undulating surfaces.
Figure 13B:
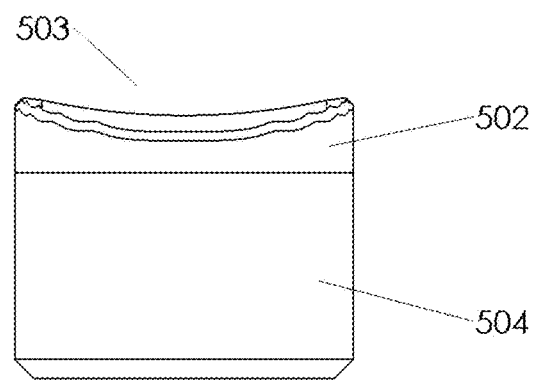
FIG. 13B is a front view of the cutter with concave cutting face in FIG. 13A.
Figure 13C:
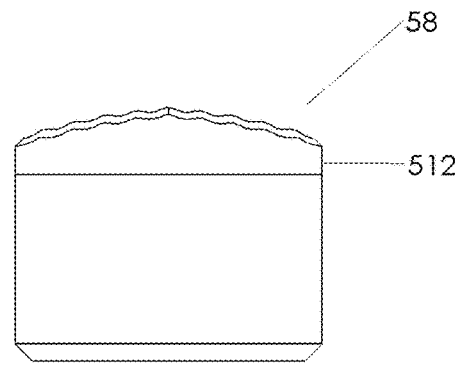
FIG. 13C is a side view of the cutter with concave cutting face in FIG. 13A.
Figure 13D:
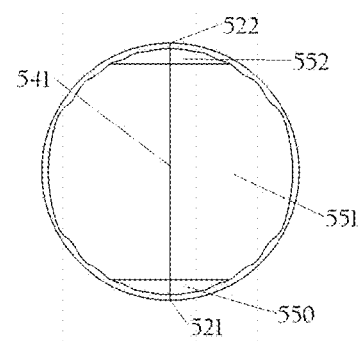
FIG. 13D is a top view of the cutter with concave cutting face in FIG. 13A.

Referring to FIGS. 13A and 13D, the cutter 58 has a substrate 504 and an ultra-hard layer 502 disposed thereon. A chamfer 507 extends from the periphery of the top surface 503 to the cutting edge 514 on the side wall 512 of the ultra-hard layer 502. The top surface 503 of the ultra-hard layer 502 is concave. Specifically, the ultra-hard layer 502 includes two cutting points 521, 522 on opposite sides on the periphery of the top surface 503. The concave cutting face comprises the first, the second, and the third undulating surfaces 550, 551, 552 arranged along the cutting ridge 541. The first, the second, and the third undulating surfaces 550, 551, 552 are propagating downward from the cutting ridge 541 to the periphery of the curved surface along perpendicular directions with respect to the cutting ridge 541. The cutter 58 has two cutting points. It allows the cutter to be re-used by rotating it by 180 degrees once one cutter point is worn and loses cutting sharpness.

The process for making a cutter may employ a body of cemented tungsten carbide as the substrate where the tungsten carbide particles are cemented together with cobalt. The carbide body is placed adjacent to a layer of ultra-hard material particles such as diamond or cubic boron nitride particles and the combination is subjected to high temperature at a pressure where the ultra-hard material particles are thermodynamically stable. This results in recrystallization and formation of a polycrystalline ultra-hard material layer, such as a polycrystalline diamond or polycrystalline cubic boron nitride layer, directly on the upper surface of the cemented tungsten carbide substrate.

The concave top surface 503 can be machined by Electrical Discharge Machining (EDM), Laser Processing (LP), Grinding or other material reduction methods. EDM is the kind of method to remove materials by employing the corrosion phenomena produced by spark discharge. In a low voltage range, EDM performs spark discharge in liquid medium. EDM is a self-excited discharge, which is characterized as follows: before discharge, there is a higher voltage between two electrodes used in spark discharge, when the two electrodes are close, the dielectric between them is broken down, and spark discharge will be generated. In the process of the break down, the resistance between the two electrodes abruptly decreases, and the voltage between the two electrodes is thus lowered abruptly. The spark channel is promptly extinguished after maintaining a fleeting time, in order to maintain a "cold pole" feature of the spark discharge, that is, there's not enough time to transmit the thermal energy produced by the channel energy to the depth of the electrode. The channel energy can corrode the electrode partially. Because the residual catalyst metal cobalt produced in the process of sintering diamond composite sheet creates conductivity, the diamond composite sheet can be used as electrodes in the EDM and thus can be machined by EDM.

EDM can avoid the error caused by the inability to accurately control the diamond shrinkage during the sintering process. EDM technology can effectively control the machining accuracy and can reduce the damage to the substrate 504 during the machining process. The concave top surface 503 formed by electric spark machining has characteristics of high processing precision, low cost, small damage to the substrate 504 and so on.

The cutter can be net shaped through the sintering process rather than machining post sintering.

In some embodiments, the present disclosure also provides a drill bit, which comprises at least one cutter in any position.

All of the compositions and methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and methods and in the steps or in the sequence of steps of the methods described herein without departing from the concept, spirit, and scope of the disclosure. More specifically, it will be apparent that certain aspects which are both related may be substituted for the aspects described herein while the same or similar results would be achieved. All such similar substitutes and modifications apparent to those skilled in the art are deemed to be within the spirit, scope and concept of the disclosure as defined by the appended claims.

What is claimed is:

1. A cutter comprising: a substrate; an ultra-hard layer; a concave surface on top of the ultra-hard layer; and a chamfer extending from a periphery of the concave surface to a cutting edge at a side wall of the ultra-hard layer; and wherein the concave surface comprises a first flat surface, a second flat surface, a curved surface, and a third flat surface arranged radially in order from a cutting point to an opposite edge of the cutting point around a periphery of the concave surface.

2. The cutter of claim 1, wherein the first flat surface has a tilted angle $\alpha$, the second flat surface has a tilted angle $\beta$, and angle $\beta$ is larger than angle $\alpha$.

3. The cutter of claim 2, wherein the third flat surface is parallel to a bottom surface of the cutter or has a tilted angle $\gamma$.

4. The cutter of claim 1, wherein the ultra-hard layer is formed of polycrystalline diamond, cubic boron nitride, or other ultra-hard materials.

5. The cutter of claim 1, wherein the concave surface is machined by electrical discharge machining methods, machined by laser processing, machined by grinding, machined by other material reduction methods, or net shaped from a sintering process.

6. A drill bit comprising at least one cutter of claim 1.

7. A cutter comprising a substrate; an ultra-hard layer; and a concave surface on top of the ultra-hard layer; wherein the concave surface comprises a first flat surface, a first curved surface, a second curved surface, and a second flat surface arranged in order from a cutting point to an opposite edge of the cutting point around a periphery of the concave surface.

8. A cutter comprising a substrate; an ultra-hard layer; and a concave surface on top of the ultra-hard layer; wherein the ultra-hard layer comprises two cutting points on opposite sides around a periphery of the concave surface, where the concave surface comprises a first flat surface and a second flat surface on two sides of the cutting points, a third flat surface at the center of the concave surface, and a curved surface between the first flat surface and the second flat surface and the flat surface at the center of the concave surface.

9. The cutter of claim 8, wherein the first flat surface and the second flat surface are slanted downwards to the periphery of the concave surface.

\* \* \* \* \*